Feb. 6, 1951 L. D. MILHAN 2,540,454
LINKAGE SYSTEM FOR FOLDABLE VEHICLE TOPS
Filed May 29, 1948 5 Sheets-Sheet 2

INVENTOR.
Lewis D. Milhan.
BY
Harness, Dickey & Pierce
ATTORNEYS.

Feb. 6, 1951   L. D. MILHAN   2,540,454
LINKAGE SYSTEM FOR FOLDABLE VEHICLE TOPS
Filed May 29, 1948   5 Sheets-Sheet 4

INVENTOR.
Lewis D. Milhan.
BY
ATTORNEYS.

Feb. 6, 1951 L. D. MILHAN 2,540,454
LINKAGE SYSTEM FOR FOLDABLE VEHICLE TOPS
Filed May 29, 1948 5 Sheets-Sheet 5

INVENTOR.
Lewis D. Milhan.
BY
Harness, Dickey & Pierce.
ATTORNEYS.

Patented Feb. 6, 1951

2,540,454

UNITED STATES PATENT OFFICE 2,540,454

LINKAGE SYSTEM FOR FOLDABLE VEHICLE TOPS

Lewis D. Milhan, Detroit, Mich., assignor to F. L. Jacobs Co., Detroit, Mich., a corporation of Michigan Application May 29, 1948, Serial No. 30,012

2 Claims. (Cl. 296—116)

This invention relates generally to extensible and collapsible vehicle tops and more particularly to linkage systems utilized for extending or retracting such tops.

While various linkage systems have been heretofore proposed for raising and lowering automotive vehicle tops they have all generally relied on link connections, particularly at the junction or pivotal connection of the side rails, whose pivotal points extend inwardly somewhat of the vehicle from the side rails of the top thereby creating a source of possible injury to the heads of either the operator or passengers of the vehicle, especially where rough roads are encountered, and which limit the width of the rear seat when the top is in a lowered position from the width which would be otherwise available in the absence of such link connections. Moreover, the conventional link connections between abutting side rails have been of such nature as to not only tend to harm the fabric of the top due to their extended height relative to the top of the rails which they interconnect but also to in time permit undesirable dropping of one of the side rails relative to the other thereby developing a "break" in the vehicle top.

An object of the present invention, therefore, is to provide a novel linkage system for extensible and collapsible vehicle tops whereby the foregoing disadvantages have been overcome.

Another object of the invention is to provide in a linkage system utilized for raising or lowering a foldable vehicle top a novel union or articulated joint between the two cooperating side rails of the top.

A further object is to provide a novel union or link connection between two adjoining side rails of a linkage system for raising or lowering a vehicle top whereby in an operative extended position the adjoining side rails are aligned and are positively locked, while in such an extended position, against any relative movement therebetween thus eliminating any possibility of a "break" in the vehicle top.

Another object is to provide a novel union or link connection between two adjoining side rails of a linkage system for raising or lowering a vehicle top wherein the various pivotal connections are arranged substantially above the two adjoining rails thereof eliminating the pivotal connections heretofore extending inwardly of the vehicle, as well as the hazard they represented to the occupants of the vehicle, and thereby also providing the rear seat of the vehicle, when the top is in a lowered or collapsed position, with several additional inches of space on each side of the seat.

A further object of the invention is to provide a linkage system for a foldable vehicle top having a novel pivotal connection between the front and adjacent side rails thereof which connection is disposed over and relatively close to the rails when the latter are extended to thereby permit proper extension of the top without any harm caused to the fabric of the top by the pivotal connection.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views.

Figure 1:
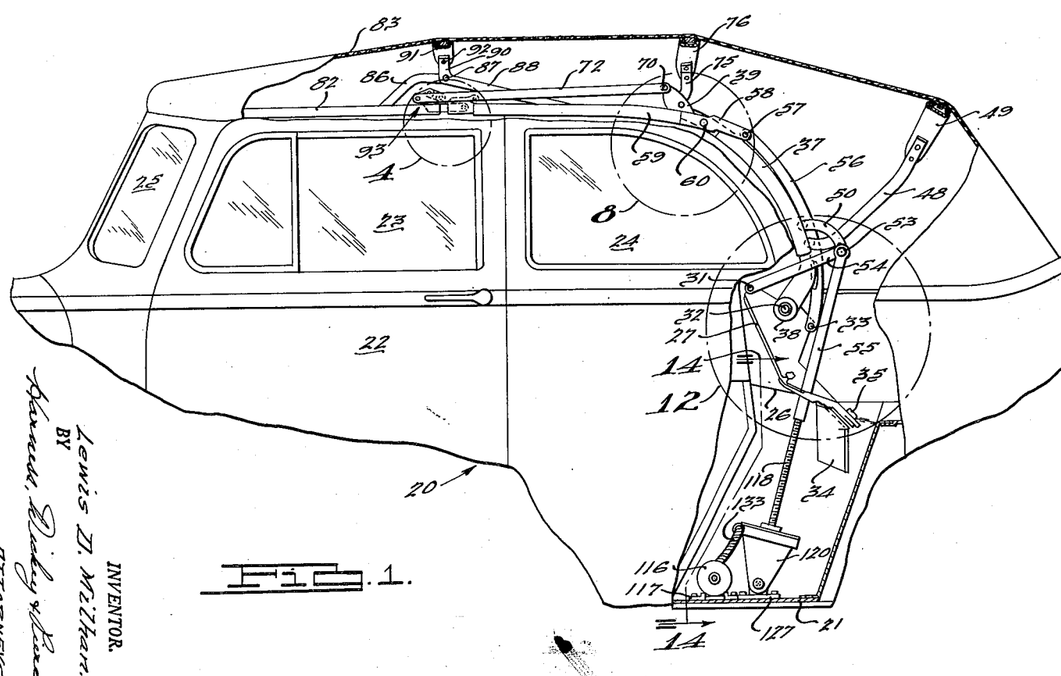
Figure 1 is a side elevation view of a vehicle, having portions thereof broken away, embodying the novel top raising or lowering linkage system of the present invention, the linkage system being illustrated in a top raised or extended position.

Referring now to the drawings for a more detailed description of the present invention and more particularly to Figure 1 thereof, the novel top actuating linkage system hereof is there shown as applied to an automotive vehicle 20 generally having a frame or chassis structure including a floor 21, together with a door 22, side windows 23 and 24 and a windshield 25.

A portion of the chassis has suitably fastened thereto on the inner side thereof a plate member 26 (Figure 3) which acts as a support for a standard or main body pivot bracket 27 for the novel linkage system hereof, the bracket having a rear wall portion 28 substantially parallel with the plate member and at its lower end being provided with an angular inward extension 29 having an extended slot 30 formed therein for a purpose to presently appear. The top inclined portion of bracket 27 may be fastened to plate member 26 by way of spaced bolts 31, 32 and 33, which also support and act as pivots for portions of the linkage system hereof, as will likewise presently appear, and the lower portion of the bracket is fastened to the chassis through the intermediary of a supporting bracket 34 to which it is secured by bolts 35, bracket 34 being welded or otherwise desirably fastened to the vehicle chassis. If desired an intermediate point of support for bracket 27 may also be provided and to this end the latter has an aperture 36 (Figure 12) for accommodating the required fastening means.

While but one standard or main body pivot bracket 27 has been shown and described it will be apparent that a similarly arranged bracket is likewise provided on the opposite side of the vehicle and that while but one vehicle side of the linkage system is shown in the drawings, the oposite side of the vehicle is provided with the same linkage system which is a duplicate of the system shown and described herein.

Pivotally mounted on bracket 27 is a pillar 37 in the form of an arcuate lever whose lower end is angularly disposed relative to the body of the pillar and has secured thereto or formed integrally therewith a hollow boss or bearing member 38 accommodating bolt 32 therein, the latter fastening the pillar for pivotal motion relative to the bracket. The opposite end of pillar 37 is provided with a bracket member 39, the latter being riveted or otherwise suitably secured to the pillar, and intermediate its two ends the pillar is provided with a channeled section 40 defining two spaced side walls 41 and 42 (Figure 13) bounded by a similarly channeled arcuate shell 43 suitably secured to the pillar. Side wall 41 of the pillar is formed with spaced apertured bosses 44 and 45 (Figure 12) which are adapted for receiving screws or bolts 46 and 47 respectively therein.

A rear bow link 48 is pivotally mounted on pillar 37 at one of its ends by way of a boss 45 and bolt 47 and at its opposite end has a rear crossbow 49 fastened thereto, the bow extending substantially the width of the vehicle to be secured at its other end to a bow link (not shown) similar to bow link 48. Boss 44 and bolt 46, on the other hand, pivotally support one end of an arcuate operating or driving link 50, which at the latter end is apertured for receiving the enlarged sleeve portion 51 of bolt 46 (Figure 13), the bolt, in turn, having an enlarged head 52 for maintaining link 50 pivotally assembled with the pillar. Link 50, at its opposite end, is pivotally interconnected by way of a pivot pin 53 with a cross lever 54, the opposite end of the latter being connected to bracket 27 by way of bolt 31 for pivotal motion relative to the bracket and a hollow tubular member 55 for a purpose to presently appear.

As better shown in Figure 12 of the drawings, bolt 33 pivotally supports one end of an arcuate balancing link 56 on bracket 27, it being noted that the pivot defined by bolt 33 is in a plane below the pivot defined by bolt 32 and the latter, in turn, is in a plane below the pivot defined by bolt 31. The opposite end of balancing link 56 is pivotally connected by means of a suitable screw or rivet 57 (Figures 2, 8 and 9) to one end of a bracket 58, the opposite end of which is secured to or formed integrally with a rear side slat or rail 59, bracket 58, in turn, being pivotally connected to bracket 39 of pillar 37 by means of a pivot pin 60 intermediate the inner end of bracket 58 and the upper pivot of balancing link 56 defined by rivet 57. Bracket 58, moreover, is provided with a cutout portion 61 to accommodate the upper end of side wall 41 of the pillar when the linkage system hereof is in a fully extended position as will be hereinafter described.

Figures 9, 11, 12, 13:
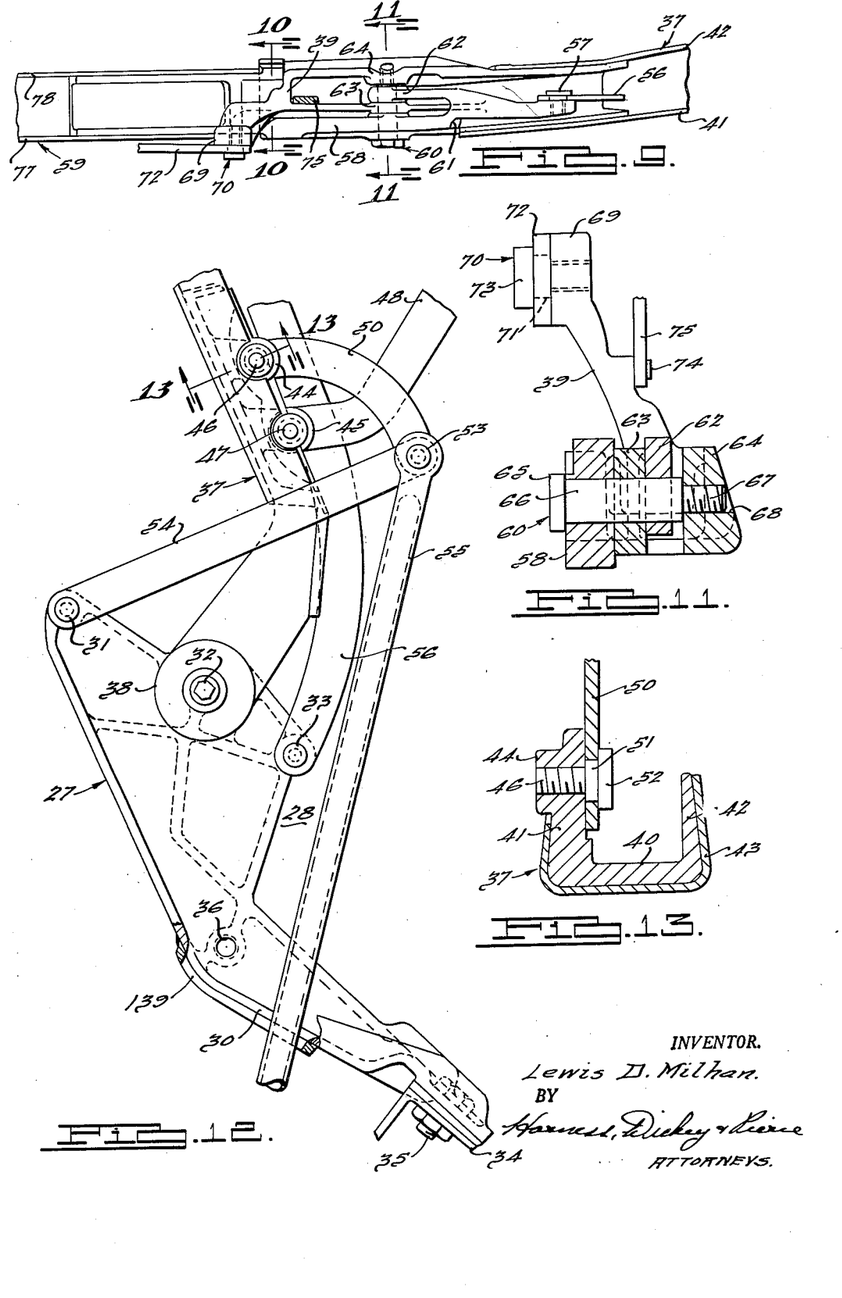
Figure 9 is a top elevation view of the structure of Figure 8.
Figure 11 is a section view taken substantially along line 11—11 of Figure 9.
Figure 12 is an enlarged side elevation detail view of that portion of the novel linkage system hereof located substantially within the confines of the circular broken line 12 of Figure 1.
Figure 13 is a section view taken substantially along line 13—13 of Figure 12.

As more clearly illustrated in Figure 9 of the drawings, bracket 58 adjacent the end which pivotally supports balancing link 56 is provided with an apertured and spaced arm 62 which is pivoted on pin 60 intermediate the two spaced arms 63 and 64 of bracket 39 which fixedly support pin 60, arm 63 of bracket 39 being arranged on pin 60 at a point intermediate arm 62 and bracket 58. Pin 60 generally comprises an enlarged head portion 65 (Figure 11) and a cylindrical shank portion 66 together with a reduced threaded portion 67 which is received within a bore 68 formed in the outer arm 64 of bracket 39. Thus, bracket 39 fixedly supports pin 60 thereon and permits movement relative thereto of bracket 58.

The outer end of bracket 39, as better shown in Figure 11, extends angularly above rear side rail 59 and at its outermost end carries an apertured boss 69 which receives a bolt 70, similar to bolt 46 of Figure 13, the latter pivotally supporting on an enlarged cylindrical section 71 thereof one end of a power link 72 which is held in assembled relation with bracket 39 by way of an enlarged head 73 of bolt 70. The opposite side of the bracket also pivotally supports thereon by way of a pin 74, located intermediate bolt 70 and pivot pin 60, an intermediate bow bracket 75 which has suitably fastened thereto an intermediate crossbow 76.

Figure 5:
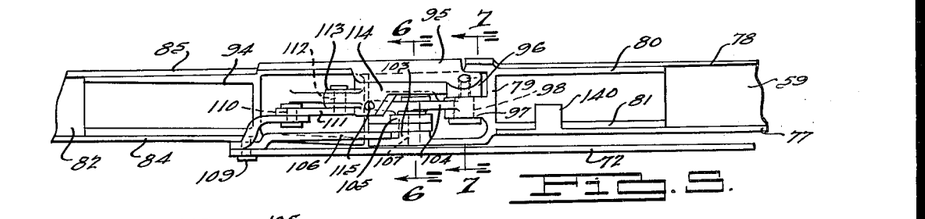
Figure 5 is a top elevation view of the structure of Figure 4.
Figures 6, 7, 8, 10:
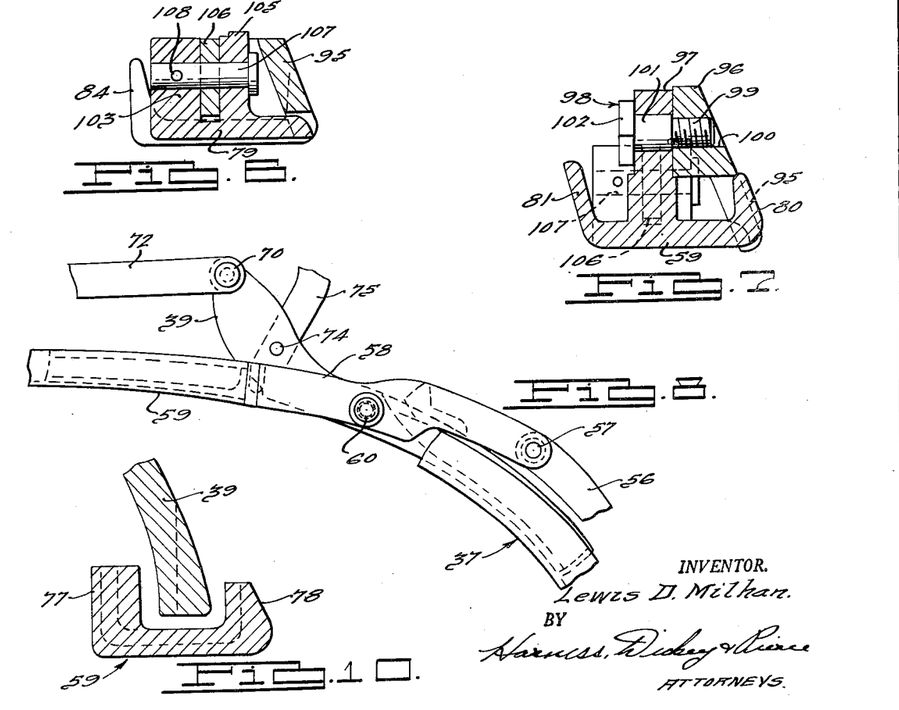
Figure 6 is a section view taken substantially along line 6—6 of Figure 5.
Figure 7 is a section view taken substantially along line 7—7 of Figure 5.
Figure 8 is an enlarged side elevation detail view of that portion of the novel linkage system hereof located substantially within the confines of the circular broken line 8 of Figure 1.
Figure 10 is a section view taken substantially along line 10—10 of Figure 9.

Rear side rail 59 is channeled as shown in Figure 10 to thereby provide two spaced parallel side walls 77 and 78, the opposite end of the rail having secured thereto or formed integrally therewith a bracket 79 (Figures 4 and 5) also supporting two spaced parallel side walls 80 and 81 thereon adapting the rear side rail for operative connection, in a manner to presently appear, to a top or front slat or side rail 82, the latter at its free end carrying the front of fabric roof or top 83, the rear of which is suitably fastened to the rear of the vehicle, and embodying a front header assembly (not shown) for anchoring the vehicle top, when the latter is in an extended position, to the windshield frame of the vehicle. Inasmuch as the header assembly, per se, constitutes no part of the present invention it has not been here illustrated.

Side rail 82, in a manner similar to rear side rail 59, is also channeled to provide two spaced parallel side walls 84 and 85 (Figure 5) and pivotally supported between the latter is one end of a link 86 which at its opposite end is connected by way of a pivot pin 87 (Figures 2 and 3) with one end of a second link 88 whose opposite end, in turn, is pivotally supported by way of a pivot pin 89 between side walls 77 and 78 of side rail 59. An extension of the first end of link 88 provides a bracket 90 to which a front crossbow 91 is fastened by way of bolts or screws 92. Portions of top 83 are suitably fastened to crossbows 49, 76 and 91.

Coming now to the novel subject matter of the present invention, the two side rails 59 and 82 are operatively interconnected through a novel linkage system, generally designated with the reference character 93 in Figure 1. The end of front slat or rail 82 adjacent the related end of rail 59 has secured thereto a bracket 94 which has an extended arm 95 (Figures 2 and 3) supporting a hollow boss 96 thereon. Adjacent its outer end, bracket 79 of rail 59, on the other hand, supports a substantially centrally located hollow boss 97 which is arranged beside boss 96. A screw or bolt 98 having a threaded end portion 99 which is received within a bore 100 of arm 95, a cylindrical shank portion 101 received within the aperture of boss 97 and an enlarged head 102 (Figure 7) maintains the two side rails pivotally interconnected. The structure constituted by the two adjoining bosses 96 and 97 maintained pivotally assembled by bolt 98 defines the main hinge of the novel linkage system hereof.

Intermediate its outer end and the boss 97, the arm 81 of bracket 79 has a second hollow boss 103 formed integrally therewith which is in a plane below the plane of main hinge 98. The side of boss 97 opposite the side on which it joins with bracket 79 has a downwardly inclined wall 104 (Figure 4) which, near the base of bracket 79, supports a hollow boss or bearing member 105, the latter being spaced from boss 103 as shown in Figures 5 and 6. Interposed between the two bosses is the apertured end of a link 106 which is pivotally mounted on bosses 103 and 105 by way of a pin 107 which, in turn, may be locked against axial movement relative to boss 103 by way of a transverse pin 108.

Figure 4:
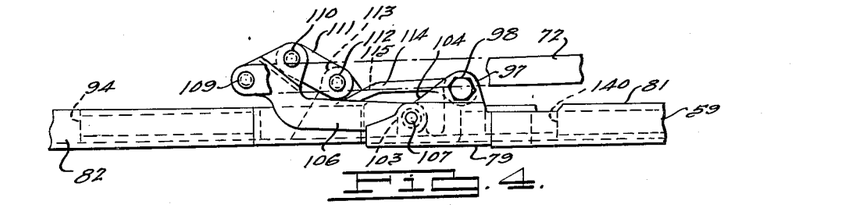
Figure 4 is an enlarged side elevation detail view of that portion of the novel linkage system located substantially within the confines of the circular broken line 4 of Figure 1.

The opposite end of link 106 is provided with an upwardly curved and outwardly bent portion, as better shown in Figures 4 and 5, which is apertured to receive a bolt or rivet 109 for pivotally interconnecting link 106 with the free end of power link 72. Link 106 thereafter extends upwardly somewhat and at an angle to its pivotal connection with power link 72 and has an inwardly bent portion which is apertured to receive a pivot pin 110 which pivotally interconnects link 106 with a relatively short link 111, the opposite end of the latter link being pivotally supported at a point below and to the side of pivot 110 by way of a pivot pin 112 on an upstanding apertured ear 113 which is formed integrally with bracket 94 of side rail 82 and which at its opposite side joins with boss 96 by way of a slightly inclined wall 114. If desired wall 114 may be provided with a threaded aperture 115 which may receive an adjusting screw (not shown) adapted for adjusting the extended position of side rail 82 relative to side rail 59 when the top is in an extended position, the screw in such an event having its end in engagement with some part of inclined wall 104.

As will be apparent from Figure 5 the novel linkage system above described for operatively interconnecting the side rails 59 and 82 is located over the two rails thereby avoiding any extensions inwardly of the vehicle from the side rails so that several inches of space are added to the width of the rear seat of the vehicle by the arrangement hereof when the top is in a lowered or collapsed position and also any hazard to the operator or occupants of the vehicle from inwardly extending pivotal connections has been eliminated. The operation of the linkage system for maintaining the side rails 59 and 82 in a desired aligned relation when the system hereof is in an extended or top raised position whereby any "break" in the vehicle top is positively prevented, will be described hereinbelow in connection with the operation of the entire top raising and lowering system hereof.

Figure 14:
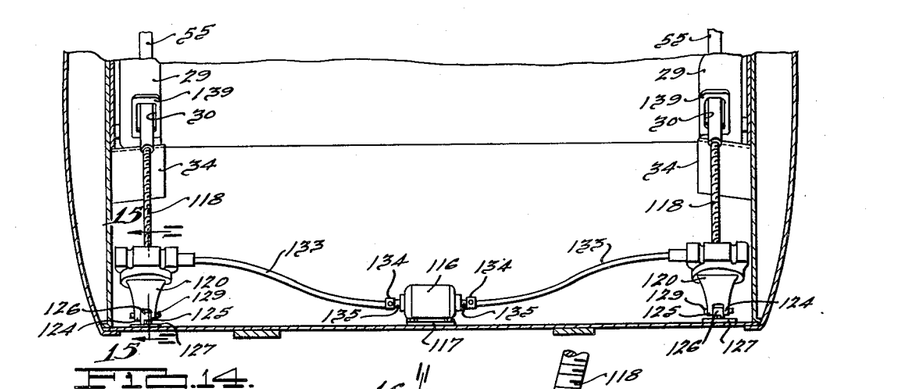
Figure 14 is a section view taken substantially along line 14—14 of Figure 1.

For raising or lowering the foldable vehicle top a reversible electric motor 116 is shown in Figure 14 located substantially centrally of the vehicle sides and suitably fastened to the vehicle floor by way of a bracket 117. It is to be specifically understood, however, that while electric operating means are shown any suitable pneumatic or hydraulic operating means could be utilized equally as well.

Figure 15:
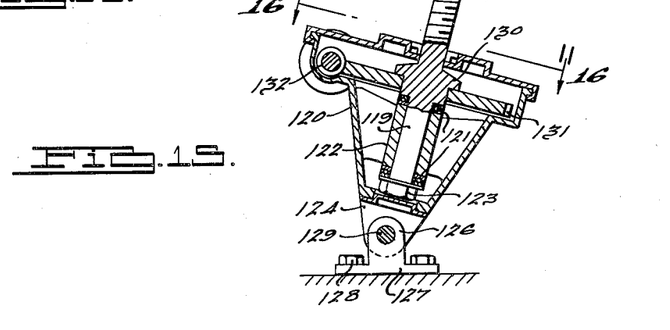
Figure 15 is a section view taken substantially along line 15—15 of Figure 14.

Tubular member 55, there being one of such members on each side of the vehicle for actuating its related linkage system, one system as heretofore mentioned being an exact duplicate of the other and being interconnected together by way of crossbows 49, 76 and 91, is screw threaded internally to telescopically receive a drive or screw shaft 118 which when rotated in one direction will move member 55 downwardly and when rotated in an opposite direction will move member 55 upwardly. The reduced unthreaded lower end 119 of each screw shaft 118 is received within a gear housing 120 (Figure 15) where it is suitably journaled in bearings 121 separated by a tubular spacer member 122 which is sleeved about end 119 of the screw shaft, spacer member 122 being maintained against displacement relative to the shaft by way of a nut 123 which engages with a reduced threaded end of the shaft (not shown) or, if desired, a bolt could be used instead for engagement with a threaded bore formed in the end of the shaft.

Each gear housing 120 at its lower end is provided with apertured and spaced parallel arms 124 and 125, between which extends an apertured lug or ear 126 of a bracket 127 which is fastened to the vehicle floor by way of bolts 128. A transverse pin 129 interconnects arms 124, 125 with ear 126 whereby the gear housing is adapted for pivotal movement relative to bracket 127, such pivotal mounting being required inasmuch as the drive or screw shaft 118 in rotating to move tubular member 55 in one direction or another will also move in an arc whose center is defined by pivot 31 (Figure 12).

Figure 16:
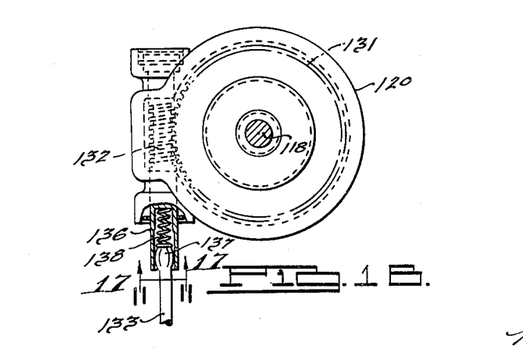
Figure 16 is a section view taken substantially along line 16—16 of Figure 15.
Figure 17:
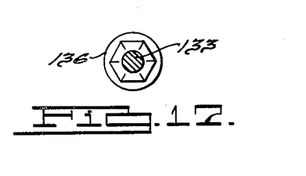
Figure 17 is a section view taken substantially along line 17—17 of Figure 16.

Each screw shaft 118 has suitably connected thereto intermediate spacer member 122 and a flange 130 of the shaft a worm wheel or gear 131 which meshes with a worm gear 132. Each worm gear 132, in turn, is secured to a separate flexible shaft 133 which at their opposite ends are connected through suitable couplings 134 with a related drive shaft 135 of motor 116, the drive shafts extending from opposite ends of the motor to facilitate the driving connection to each of the worm gears 132. As more clearly shown in Figure 16, each worm gear 132 is provided with a hollow tubular portion 136 which projects outwardly of the gear housing to receive outer end portions 137 of flexible shafts 133. Each end portion 137 is formed to embody any desired number of straight sides to thereby insure a positive non-slipping driving connection between shafts 133 and worm gears 132. The opposite end of each flexible shaft 133 may be formed in the same manner to similarly secure a positive connection with motor driving shafts 135 through couplings 134. Both of the many sided end portions of each of the flexible shafts are preferably rounded, as shown in Figures 16 and 17, to define a more or less universal connection to permit canting of the flexible shafts relative to the motor and gear housings during raising or lowering of the top. Yieldable means in the form of a spring 138 is mounted within each of tubular portions 136 to urge the flexible shafts outwardly whereby the latter are maintained within couplings 134.

If desired a rectangular bearing element 139 may be fastened to the underside of portion 29 of main body pivot bracket 27 to border about slot 30 for accommodating transverse as well as swingable motion of tubular member 55 therein. Any desired circuit including a selector switch accessible to the operator of the vehicle may be utilized to operate the motor in one direction or another.

Figure 3:
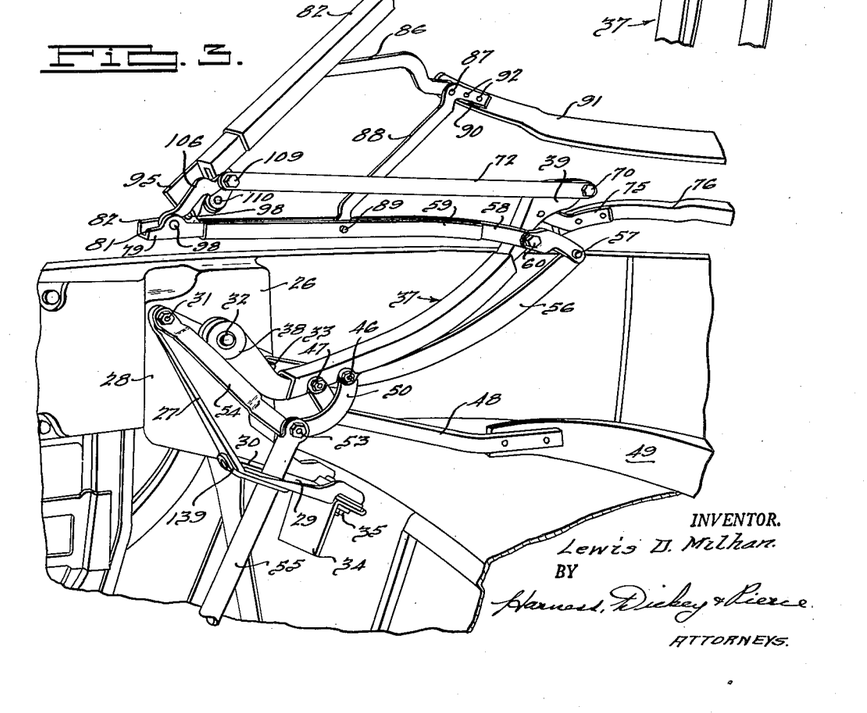
Figure 3 is an enlarged perspective view showing the novel linkage system hereof in a nearly collapsed position or a position where extension of the system has just been initiated.

Coming now to the operation of the novel linkage system of the present invention for extending or raising top 83 from a collapsed or lowered position to the fully extended position of Figure 1, the selector switch (not shown) is operated to energize the motor whereby the latter operates in one direction to turn screw shaft 118 in a direction to raise both tubular members 55, the latter in a top lowered or collapsed position occupying a position at some point on the screw shaft near the top of gear housings 120 and at the same time pillar 37 and side rails 59 and 82 being in some position lower than that illustrated in Figure 3 in which crossbows 49, 76 and 91 will rest substantially one over the other with the pillar and side rails likewise resting one over the other in substantially parallel planes.

As motor 116 operates to move each tubular member 55 upwardly through flexible shafts 133, worm gears 131 and 132 and screw shafts 118, each tubular member 55 imparts its driving force to its related pillar 37 through each of driving or operating links 50. Since the fixed pivot 31 to which tubular member 55 is connected by cross lever 54 is above the fixed pivot 32 of the pillar, driving link 50 can move in but an upward direction and thereby swings pillar 37, to which it is pivotally connected by way of pivot 46, in a counterclockwise direction about its pivot 32. It will be noted that in addition to moving upwardly, tubular member 55 also swings in an arc about pivot 31 by virtue of its connection therewith by way of lever 54 so that while in a top collapsed position the member 55 occupies some position near the right hand end of slot 30 (Figure 3), in a fully extended top position it will occupy a position adjacent the left hand end of slot 30 (Figure 1), gear housing 120 being pivotally mounted on the vehicle floor to accommodate such motion.

As pillar 37 is swung counterclockwise about its pivot 32 by motor 116 through operating link 50, it carries balancing link 56 therewith, to which it is connected by way of pivot 60 and bracket 58 of rear side rail 59, causing link 56 to move in a counterclockwise direction about its pivot 33, link 56 being pivotally connected to bracket 52 by way of a pivot 57. Rear side rail 59 is at the same time lifted and moved to the left by pillar 37 through pivot 60, link 56 guiding the forward motion of rail 59. At this point front side rail 82 may be in some rest position over the top of side rail 59 with links 86 and 88 still in a fully collapsed position and front crossbow 91 lying over intermediate crossbow 76.

Figure 2:
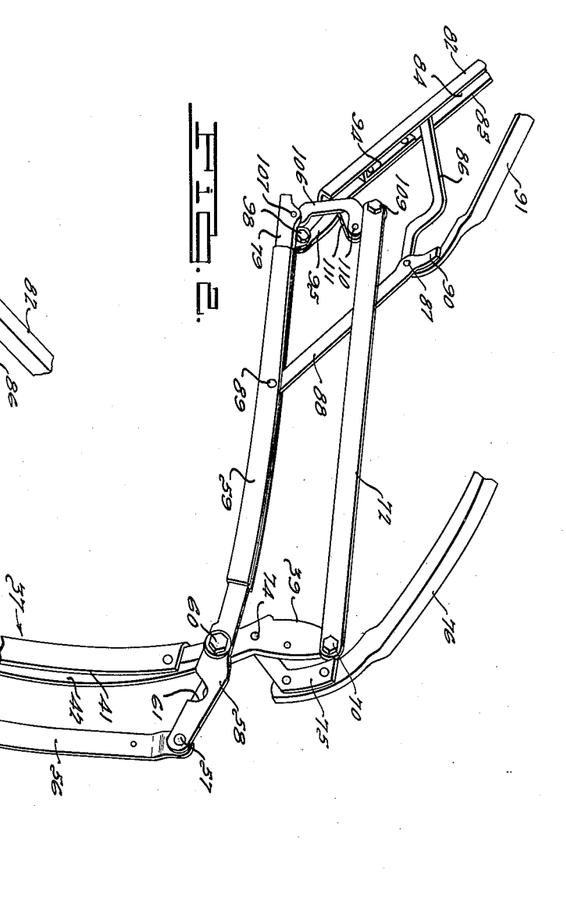
Figure 2 is an enlarged detail view in perspective of a portion of the novel linkage system of Figure 1, the latter system being illustrated in a position it assumes when in a partially extended or retracted position.

With continued upward movement of tubular member 55 toward its fully lifted or extended position, such as that illustrated in Figure 2, the rear side rail 59 has been extended over and beyond the frame of rear window 24. At the same time pillar 37 will have moved power link 72 forwardly to the position of Figure 2 wherein the link 72 and rail 59 define the upper and lower ends of a parallelogram, the spaced sides of which comprises both a portion of bracket 39 and link 106. Forward motion of power link 72 applies a forward force on pivot 109, which joins power link 72 with link 106, causing the latter link to move in a counterclockwise direction about its pivot 107. By so moving, link 106 carries pivot 110 therewith in a counterclockwise direction about pivot 107. Since pivot 110 is interconnected with pivot 112 by way of link 111, pivot 112 will also be moved in a counterclockwise direction but its movement will be about pivot or main hinge 98 as a center. Inasmuch as pivot 112 is connected with front side rail 82 through ear 113 of bracket 94, rail 82 is also caused to move in a counterclockwise direction relative to rear side rail 59 about main hinge pivot 98. As a result of such motion by rail 82, link 86 is pulled downwardly to an extended position and it also moves link 88 in a counterclockwise direction about its pivot 89 to thereby move front crossbow 91 forwardly and downwardly to position the vehicle top. As tubular member 55 reaches its limit of upward movement, power link 72 will have moved forwardly enough to extend front side rail 82 into alignment with rear side rail 59 (Figure 1) so that the header mechanism of the top will engage with the frame of windshield 25 to which it will be locked through suitable locking means by the operator. A limit switch (not shown) may be utilized to de-energize the motor when the top lifting operation has been completed or the motor may be de-energized manually by operation of the selector switch.

With the linkage system hereof in the fully extended top position illustrated in Figure 1 wherein crossbows 49, 76 and 91 have been positioned about their various pivots in the manner shown, power link 72 will have moved pivot 109 to the position shown in Figures 4 and 5 wherein it will be located below and beyond pivot 110 and will be in substantial alignment with pivot 112. At this point, pivots 107, 110 and 112 will have reached an aligned position, i. e., all three pivots will be located in a common, inclined straight line with pivot 110 located above pivot 112 and the latter pivot located above pivot 107. The relation of the length of link 106 relative to the length of link 111 and the location of the two fixed pivots 98 and 107 is such that as the pivots 107, 110 and 112 reach the aligned position of Figure 4, front side rail 82, being now in alignment with rear side rail 59, is positively prevented from any further downward motion about main hinge 98. This results from the fact that even though during counterclockwise motion of link 106 the distance between fixed pivot 107 and movable pivot 110 remains fixed, the distance between fixed pivot 107 and movable pivot 112, whose locus of movement is about hinge 98, the latter being above and to the right of fixed pivot 107, is gradually reduced until at the point where pivot 112 aligns with pivots 107 and 110 the reduction becomes critical and locks link 106 against any further downward movement. This locking action is analogous to the operation of a toggle which locks when the outer ends of the two links thereof align with the knee or common pivotal connection of the two links. By virtue of the foregoing novel construction front side rail 82 is positively prevented from swinging below or out of alignment with rear side rail 59 and is thus desirably maintained in the aligned position with rear side rail 59 shown in Figure 1 whereby a "break" in the top cannot and will not occur.

To lower top 83 to a fully collapsed position, the header mechanism is unlocked by the operator and the selector switch is actuated to operate motor 116 in a direction opposite to its direction of rotation for raising the top. Rotation of screw shafts 118 is thus reversed so that tubular members 55 are caused to move downwardly on the screw shafts thereby pivoting and moving pillar 37 in a clockwise direction about its pivot 32, pillar 37 initiating through pivot 60 an upward and rearward motion of rear side rail 59. Such motion results in a similar clockwise motion through pivot 60 of balancing link 56 about its pivot 33, the balancing link initiating, in turn, a counterclockwise movement of rear side rail 59 about pivot 60. Simultaneously, due to clockwise motion of pillar 37, power link 72 is pulled to the right (Figure 1) through bracket 39 and pivot 70 whereupon pivot 109 is moved in a clockwise direction about pivot 107 to thereby raise and move front side rail 82 in a clockwise direction about its pivot 98 relative to rear side rail 59. At the same time, crossbows 49, 76 and 91 initiate rearward motion to return top 83 to its rearward or collapsed position.

Continued downward motion of tubular member 55 causes the entire linkage system hereof to pass from a position such as that shown in Figure 2, for example, to and through the position of Figure 3 until finally links 86 and 88 collapse to permit front crossbow 91 to overlie intermediate crossbow 76, which, in turn, overlies rear crossbow 49 and front side rail 82 due to the action thereon of power link 72 will rest over rear side rail 59 and the latter due to the action of balancing link 56 thereon will rest over pillar 37, tubular member 55 at this point swinging to some position adjacent the right hand end of slot 30. In order that pivot 110 may be accommodated in its top collapsed position over the top of rear side rail 59, a cutout portion 140 is provided in both bracket 79 and arm 81 of the bracket. As the fully lowered or collapsed top position is achieved, motor 116 may be de-energized by either actuation of the selector switch or by the operation of a limit switch (not shown). In the latter top position, tubular member 55 will have travelled on its screw shaft to some position closely adjacent the top of gear housing 129 so that the entire mechanism is again in readiness for a subsequent top raising or lifting operation.

There has thus been provided a novel and desirable lifting of lowering linkage system for a vehicle top by virtue of which, in the top extended position, a desired aligned relation is maintained between adjacent rails thereof thereby eliminating the development of a "break" in the top and at the same time the articulated connection between the side rails is of such a character as to be superimposed over the rails whereby undesirable and hazardous pivotal connections extending inwardly of the vehicle have been eliminated and at the same time the rear seat of the vehicle has been provided with several additional inches of useable space.

Although but a single embodiment of the present invention has been illustrated and described in detail, it is to be expressly understood that the invention is not limited thereto. Various changes may be made in the design and arrangement of the parts without departing from the spirit and scope of the invention as will now be understood by those skilled in the art.

What is claimed is:

1. In an extensible and retractible vehicle top mechanism, a first side rail, a second side rail pivotally connected to said first side rail, a power link for driving said second side rail relative to said first side rail, a second link pivoted at one end to said power link and at its other end to said first side rail, the pivotal connection of said second link with said first side rail being below and to one side of the pivotal connection of said second side rail with said first side rail, and a third link shorter than said second link pivoted at one end to said second link and at its other end to said second side rail, the pivotal connection of said third link with said second link being over and to the side of the pivotal connection of said second link with said power link whereby in response to pivotal movement of said second side rail relative to said first side rail the pivotal connections of said third link with said second link and with said second side rail and the pivotal connection of said second link with said first side rail will become aligned when said second side rail is driven into substantial alignment with said first side rail to thereby lock said second side rail against further motion in the same direction relative to said first side rail.

2. In an extensible and retractible mechanism for raising and lowering a foldable vehicle top having one end thereof secured to the rear of the vehicle comprising a pillar pivoted at one end on said vehicle, a power link pivoted at one end on the opposite end of said pillar for actuation thereby, a first side rail pivoted at one end on said pillar intermediate the outer ends of said pillar and having an extension therebeyond, a second side rail having the opposite end of said top connected thereto at a forward end thereof pivoted at its other end to the opposite end of said first side rail, a second link pivoted at one end to the opposite end of said power link above said rails and at its other end to said first side rail at a point below and to the side of the pivotal connection of said second side rail with said first side rail, a third link pivoted at one end to said second link above and to the side of the pivotal connection of said second link with said power link and at its other end to said second side rail, a balancing link pivoted at one end on said vehicle adjacent the pivoted connection of said pillar and at its other end to the extension of said first side rail, and means for actuating said pillar to operate said mechanism.

LEWIS D. MILHAN.

(References on following page)

REFERENCES CITED

The following references are of record in the file of this patent:

UNITED STATES PATENTS

| Number | Name | Date |
|---|---|---|
| 1,034,899 | Golde | Aug. 6, 1912 |
| 1,065,092 | Wolfermann | June 17, 1913 |
| 2,066,231 | Salmons et al. | Dec. 29, 1936 |
| 2,128,849 | Redfern | Aug. 30, 1938 |
| 2,331,603 | Falcon | Oct. 12, 1943 |
| 2,365,765 | Keller | Dec. 26, 1944 |

FOREIGN PATENTS

| Number | Country | Date |
|---|---|---|
| 203,558 | Great Britain | Sept. 13, 1923 |
| 217,202 | Great Britain | May 23, 1924 |